Jan. 2, 1951  R. S. JOHNSON ET AL  2,536,940
WINDSHIELD WIPER
Filed Aug. 2, 1946
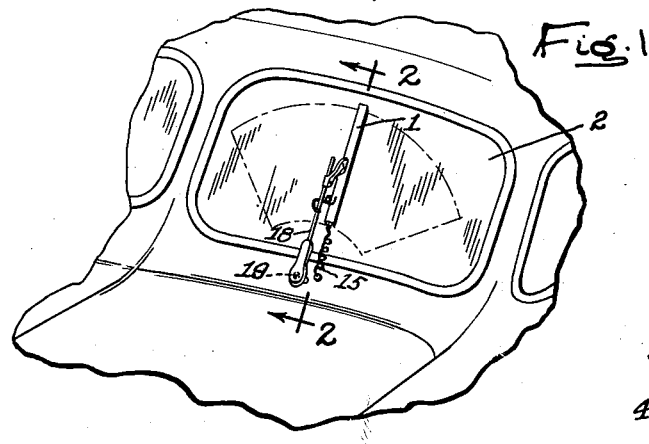
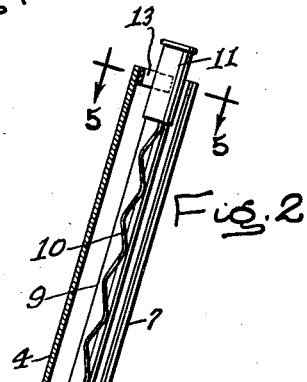
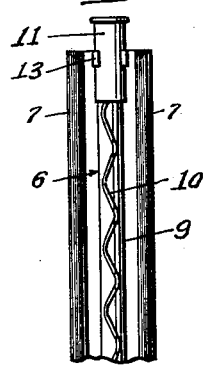
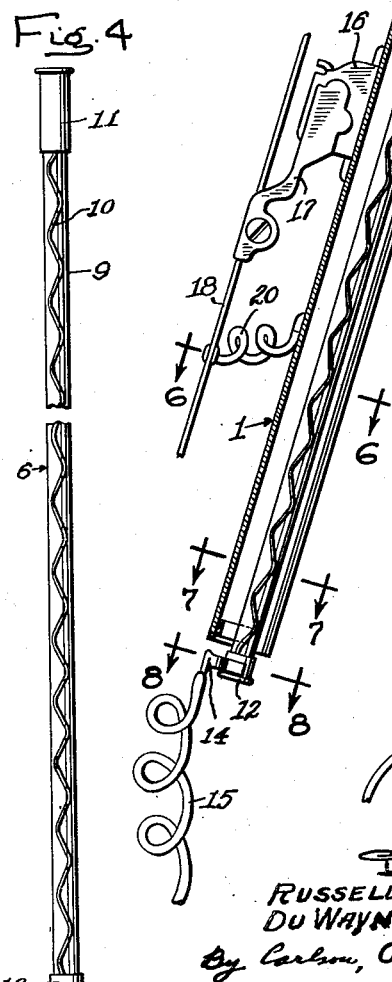
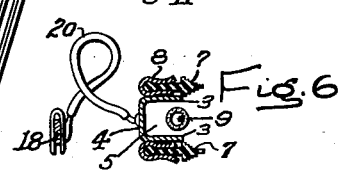
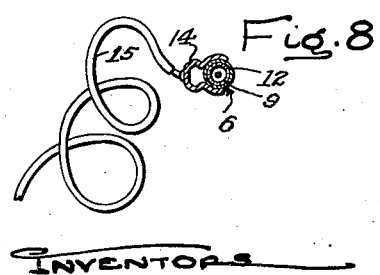
INVENTORS
RUSSELL S. JOHNSON
DUWAYNE O. JENSEN
By Carlson, Pitzner, Hubbard & Wolfe
ATTORNEYS Patented Jan. 2, 1951

2,536,940

UNITED STATES PATENT OFFICE 2,536,940

WINDSHIELD WIPER

Russell S. Johnson and Du Wayne O. Jensen,
Fond du Lac, Wis.

Application August 2, 1946, Serial No. 688,143

3 Claims. (Cl. 219—19)

The present invention relates generally to glass wipers, and more particularly to improvements in windshield wipers provided with heating means for effecting removal of snow, sleet and ice from the windshield.

One of the objects of the present invention is to provide a new and improved heated windshield wiper which is efficient and reliable in operation, and which is simple and inexpensive in construction.

Another object is to provide a windshield wiper having a novel self-contained heating unit which is adapted to be mounted therein for ready and convenient insertion and detachment.

A further object is to provide a new and improved heating element for a windshield wiper comprising a sealed tube enclosing an electric filament, and having metal ferrules at opposite ends adapted for connection in an electrical circuit as an incident to mounting the unit in position.

Other objects and advantages will become apparent as the description proceeds.

In the accompanying drawings:

Figure 1 is a perspective view showing a windshield wiper, embodying the features of the present invention, in association with a windshield.

Fig. 2 is a longitudinal sectional view on an enlarged scale through the windshield wiper.

Fig. 3 is a bottom view of the wiper.

Fig. 4 is a side elevational view of the heating element utilized in the wiper.

Figs. 5, 6, 7 and 8 are fragmentary transverse sectional views taken respectively along lines 5—5 to 8—8 of Fig. 2.

Referring more particularly to the drawings, the windshield wiper, constituting the exemplary embodiment of the invention, comprises an elongated housing 1 adapted to be supported for sliding or swinging movement across the surface of a glass 2. The housing 1 is made of electrical conducting material, such as metal. In the preferred form, the housing 1 is open at the ends and channel shaped in cross section, with spaced parallel longitudinal side walls or legs 3 connected by a coextensive back wall 4, to define a chamber 5 for ready insertion of a self-contained heating unit or element 6.

Two wiping strips or blades 7 of yieldable material, such as flexible rubber or rubber composition, extend along and are secured to the side legs 3 of the housing 1 for movement therewith. These blades may be of any desired form and supported on the legs 3 in any suitable manner. In the present instance, the outer longitudinal edges of the blades 7 are tightly clamped within metal U-shaped frame members 8 and the latter are rigidly secured, as by soldering or welding, to the outer sides of the legs 3. Preferably, the frame members 8 are coextensive in length and width with the legs 3, and also coextensive in length with the blades 7.

The heating element 6 is constructed as a complete or self-contained unit which is adapted to be quickly and conveniently inserted into or removed from the chamber 5 merely by lateral displacement. More particularly, the heating element or unit 6 comprises a closed elongated tube 9 of electrical insulating material, such as glass, and an electric heating filament 10 extending longitudinally therethrough. As shown, the filament 10 consists of a metal wire which is formed into a long lead spiral to contact the inner surface of the tube 9. Metal ferrules 11 and 12 are tightly secured about the opposite ends of the tube 9, and are closed at their outer ends to seal the interior of the tube. The opposite ends of the heating filament 10 are rigidly secured for good electrical contact with the ferrules 11 and 12.

Secured to the back wall 4 of the housing 1 at opposite ends of the chamber 5 are suitable spring clips 13 adapted to receive and peripherally grip opposite end portions of the heating element 6 upon lateral insertion of the latter. The clips are made of electrical conducting material, and may be attached to the housing 1 in any desired manner, as for example, by welding or soldering, to obtain good electrical contact. One of the ferrules, i. e., the ferrule 11, is relatively long and adapted to be embraced by the clip 13 at the outermost end of the holder 1 to detachably retain the corresponding end of the tube, and at the same time to ground one end of the heating filament 10 to the holder. The tube 9 is slightly longer than the housing 1 so as to locate the other ferrule, i. e., the ferrule 12, outside of the innermost end of the housing 1 beyond the adjacent clip 13. Thus, the innermost clip 13 directly embraces the insulated surface of the tube 9, and is out of electrical contact with the ferrule 12. The latter is comparatively short, and serves as a readily accessible terminal post adapted for electrical connection through a detachable clip 14 with an electrical conductor 15 adapted to lead to a source of electrical energy, such as the storage battery (not shown) of an automobile.

The housing may be supported for movement across the glass 2 in any conventional manner. As shown, the back wall 4 of the housing 1 is provided midway of its ends with a fitting 16 adapted for detachable floating connection with a bracket arm 17 adjustably secured on the free end portion of a flat metal arm 18. The other end of the arm 18 may be connected to a rockshaft 19 supported for power oscillation, and grounded for connection to one terminal of a source of electricity. To insure a good electrical connection, an electrical conductor 20 is directly connected at opposite ends to the housing 1 and the arm 18.

In operation, whenever the accumulation of snow, sleet or ice on the glass or windshield 2 becomes objectionable, current may be supplied through a control switch (not shown) to energize the heating element or unit 6. As a result, heat radiating from the element 6 to the windshield 2 will cause the snow, sleet or ice to melt, and be removed by the oscillating blade 7 of the windshield wiper. It will be evident that the wiper is simple and compact in construction and attractive in appearance. The heating element or unit 6 may be easily and conveniently inserted or removed for purposes of replacement. The unit 6 is fully self-contained, and constructed to hermetically enclose the filament 10.

We claim as our invention:

1. A windshield wiper comprising, in combination, an elongated metal housing of generally U-shaped cross section having a back wall and spaced parallel side legs, said housing defining a chamber open at the ends and along one side between said legs, two U-shaped frame members rigidly secured to and extending along the outer sides of said legs, two flexible wiper blades clamped respectively in said frame members and projecting in parallel spaced relation outwardly beyond the free longitudinal edges of said legs, two spring clips secured respectively to opposite ends of said back wall within said chamber, and a self-contained heating unit adapted to be removably gripped by said clips, said unit being longer than said housing and including an elongated sealed electrical insulating tube, metal ferrules on and closing the opposite ends of said tube, and an electrical heating filament extending through said tube and anchored to said ferrules, one of said ferrules being adapted for engagement by one of said clips to establish an electrical ground connection through said housing, and the other being adapted for location outside of said housing out of contact with the other of said clips and constituting an electrical terminal for connection with a source of electric power.

2. A windshield wiper comprising, in combination, an elongated metal housing having a back wall and spaced parallel side legs, said housing defining a chamber open at the ends and along one side between said legs, two frame members rigidly secured to and extending along said legs, two flexible wiper blades secured respectively in said frame members and projecting in parallel spaced relation outwardly beyond the free longitudinal edges of said legs, a plurality of spring clips secured to said housing within said chamber, and a self-contained heating unit adapted to be removably gripped by said clips, said unit including an elongated insulating tube, metal ferrules on opposite ends of said tube, and an electrical heating filament extending through said tube and anchored to said ferrules, one of said ferrules being adapted for engagement by one of said clips to establish an electrical connection with said housing, and the other constituting an electrical terminal for connection with a source of electric power.

3. A windshield wiper comprising, in combination, an elongated metal housing having a back wall and spaced parallel side legs, said housing defining a chamber open along one side between said legs, two flexible wiper blades secured respectively to and projecting in parallel spaced relation outwardly beyond the free longitudinal edges of said legs, two spring clips secured in longitudinally spaced relation to said housing within said chamber, and a heating unit adapted to be removably gripped by said clips upon movement transversely into said chamber, said unit including an elongated electrical insulating member, metal contacts on opposite ends of said member, and an electrical heating filament extending along said member and anchored to said contacts, one of said contacts being adapted for engagement by one of said clips to establish an electrical connection with said housing, and the other constituting an outside electrical terminal for connection with a source of electric power.

RUSSELL S. JOHNSON.
DU WAYNE O. JENSEN.

REFERENCES CITED

The following references are of record in the file of this patent:

UNITED STATES PATENTS

| Number | Name | Date |
| --- | --- | --- |
| 895,857 | Hayden | Aug. 11, 1908 |
| 1,394,187 | Creighton | Oct. 18, 1921 |
| 1,724,948 | Maertins | Aug. 20, 1929 |
| 1,858,483 | Conrad | May 17, 1932 |
| 1,885,710 | Gentry et al. | Nov. 1, 1932 |
| 2,215,587 | Kerschbaum | Sept. 24, 1940 |